United States Patent [19]
Evans

[11] 3,788,222

[45] Jan. 29, 1974

[54] FUSEE IGNITING DISPENSER

[76] Inventor: Clarence F. Evans, 26801 Camargo Dr., Saugus, Calif. 91350

[22] Filed: Dec. 4, 1972

[21] Appl. No.: 311,633

[52] U.S. Cl. .............................. 102/37.4, 221/136
[51] Int. Cl. ............................................. C06d 1/04
[58] Field of Search .................... 221/136–141, 142, 221/148, 266, 149; 102/37.5, 37.52, 37.6, 37.7, 37.4

[56] References Cited
UNITED STATES PATENTS

| 636,946 | 11/1899 | Berman | 221/142 |
|---|---|---|---|
| 3,698,317 | 10/1972 | Finch | 221/142 |

*Primary Examiner*—Stanley H. Tollberg
*Attorney, Agent, or Firm*—W. W. Glenny et al.

[57] ABSTRACT

A rollable cart with a telescoping handle to facilitate pushing by the user, and including a hopper for carrying a supply of fusees to be ignited, transport means operated in timed relation with rotation of the cart wheels for moving one fusee from the hopper so that its igniter end is forced into abutting contact with a heated member for igniting the fusee, and means for then dropping the ignited fusee onto the ground, as the cart is pushed therealong by the user. Disabling means are included to prevent the transporting, ignition and dispensing of fusees during rearward movement of the cart, as when being towed back to the starting point of fusee distribution. The handle and hopper form a unitary structure which is quickly and easily disassemblable from the cart proper, to facilitate packing in a small area such as in the trunk of a peace officer's automobile.

13 Claims, 9 Drawing Figures

PATENTED JAN 29 1974 3,788,222
SHEET 1 OF 2
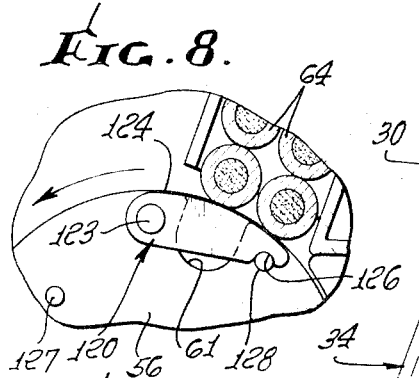
FIG. 8.
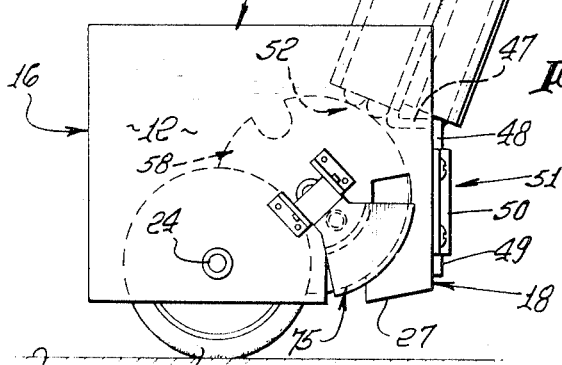
FIG. 1.
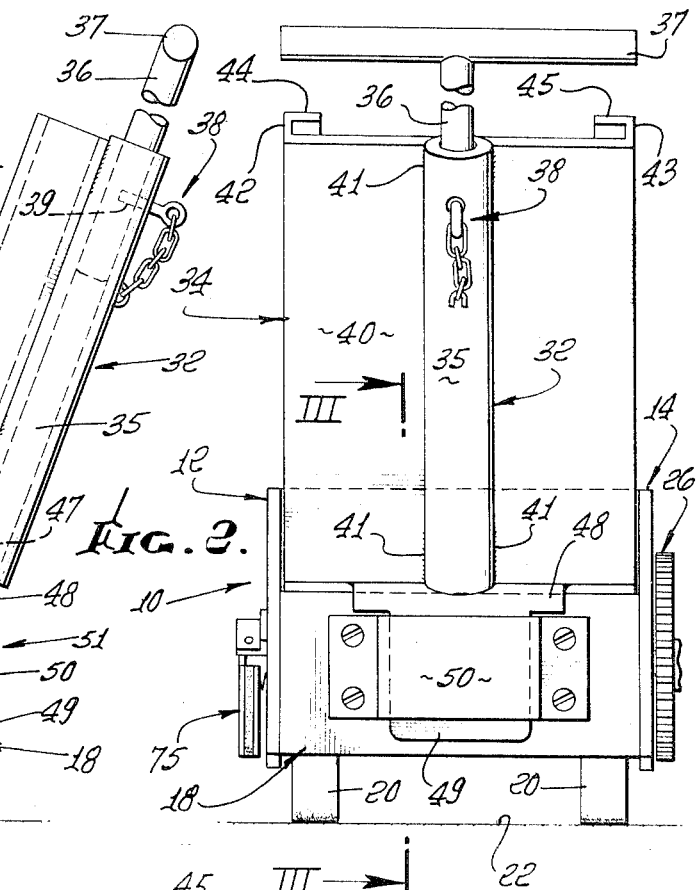
FIG. 2.
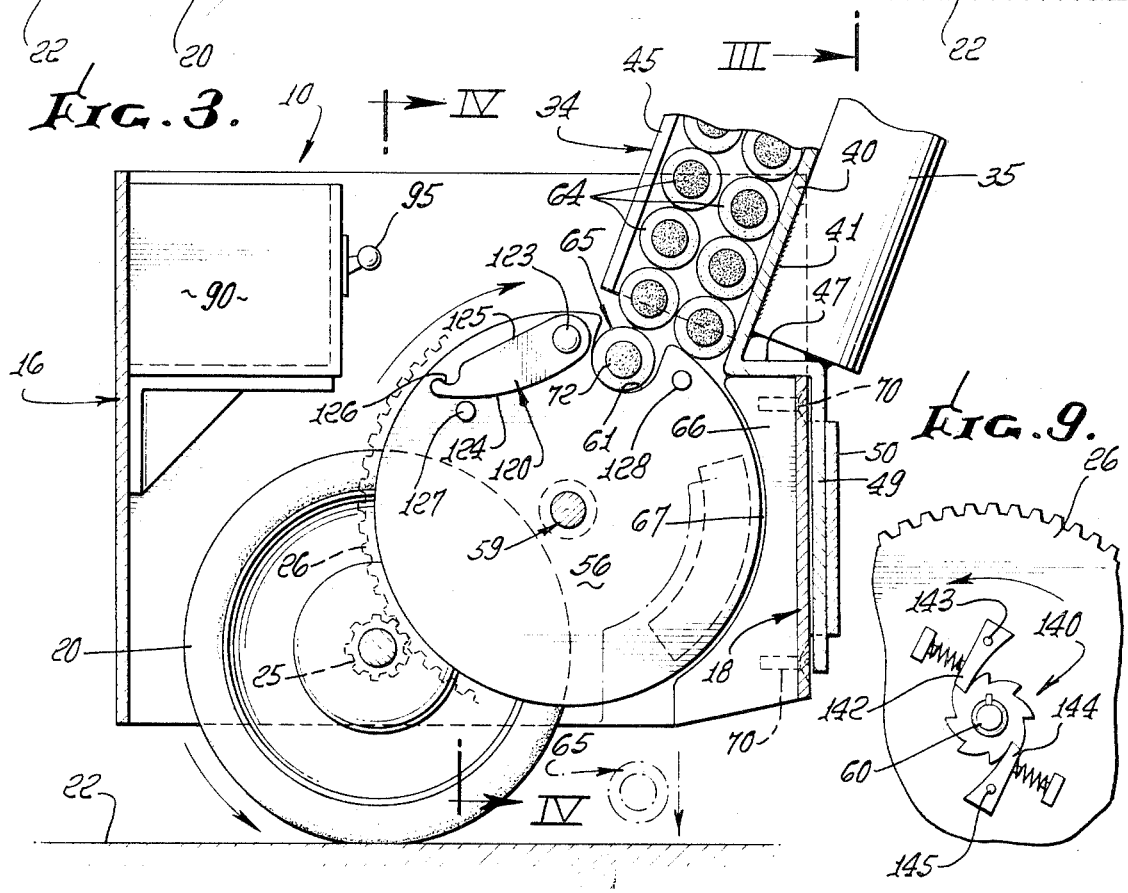
FIG. 3.
FIG. 9.

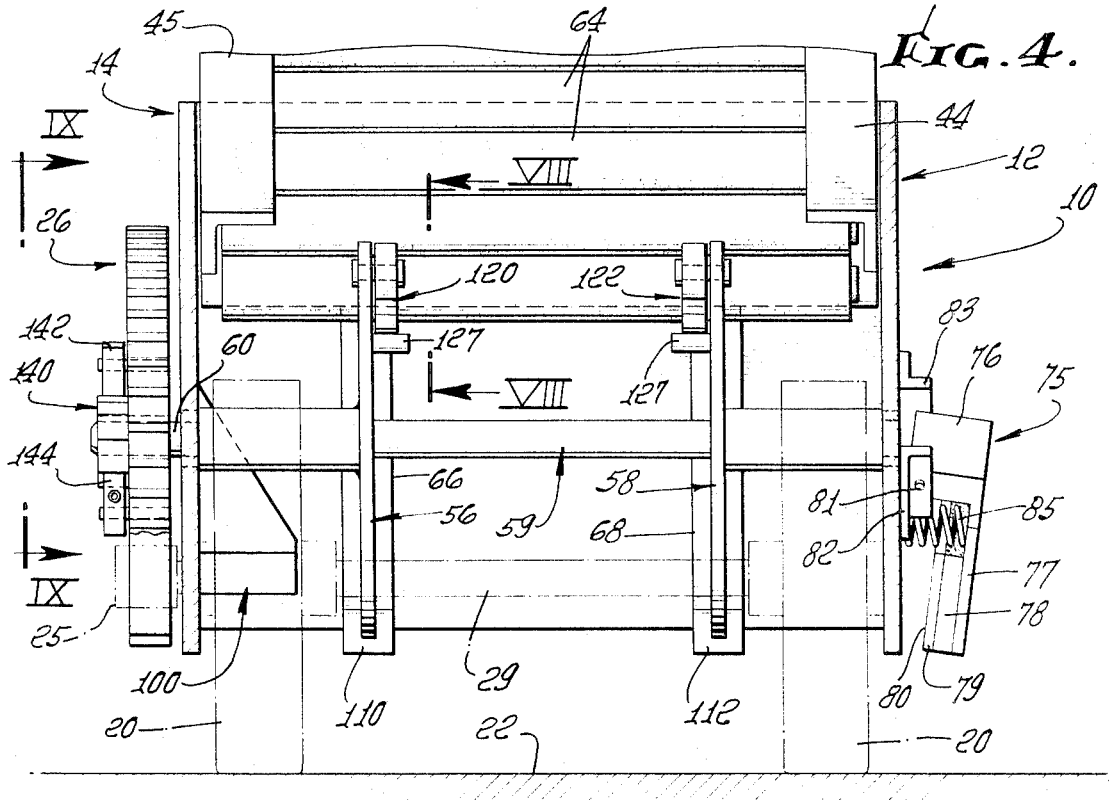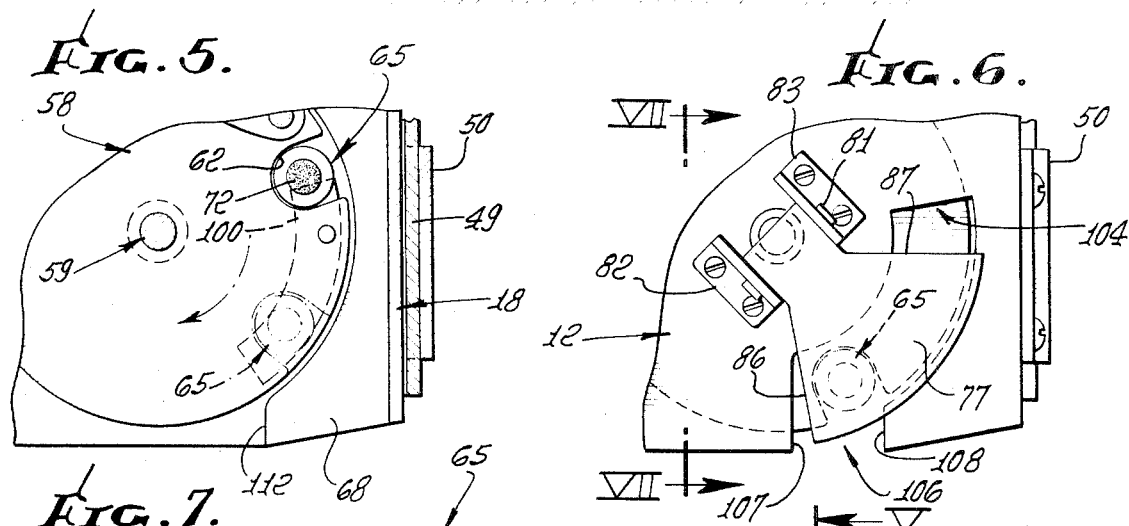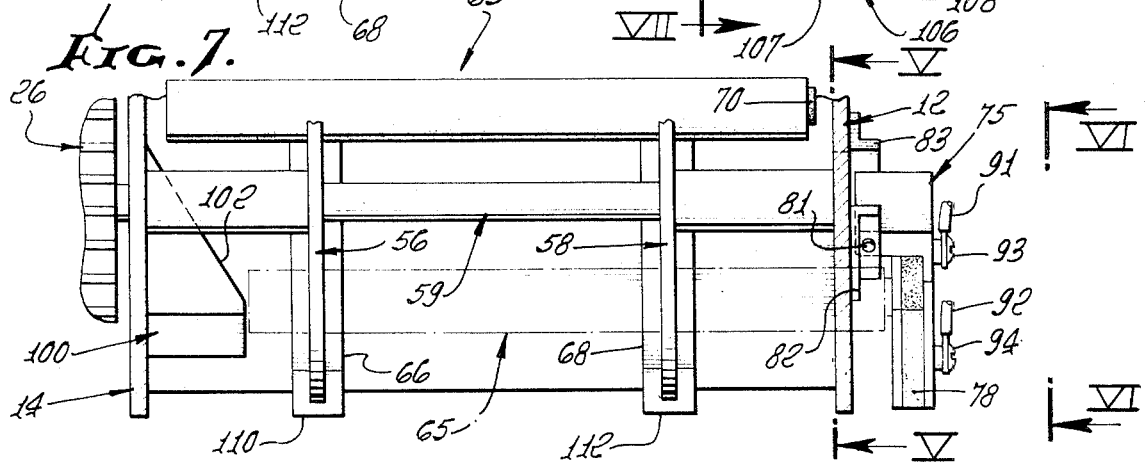

FUSEE IGNITING DISPENSER

BACKGROUND AND FIELD OF THE INVENTION

The present invention relates generally to a device for dispensing ignited fusees at spaced intervals along the ground, and more particularly to a small, inexpensive cart mounted upon a pair of wheels to be pushed along a roadway or other area where ignited flares are to be placed, as to protect the scene of a highway accident or the like.

When a peace officer first arrives at the scene of a highway accident, his most important immediate duty is to protect the accident by warning oncoming motorists to decrease speed and by guiding such motorists safely around the accident. This duty is conventionally carried out by the officer's distributing fusees along the side of the roadway in a direction toward oncoming traffic for a distance depending upon visibility conditions, ranging up to as much as several hundred yards. Conventionally the peace officer performs this duty by walking along the roadway with a supply of fusees in his arms or pockets, and he ignites and drops a fusee at desired intervals along a path selected by him to warn oncoming motorists and to guide them safely past the accident. The conventional fusee for burning for about 15 minutes is approximately 10 inches long and 1 inch in diameter. It can be readily seen that carrying a supply of 20 or more of such fusees is a cumbersome and awkward task, compounded by the necessity of individually breaking off the igniter cap and igniting each individual fusee as the officer arrives at the selected spot for placing a fusee.

In accordance with the present invention, there is provided a cart supported by a pair of ground-engaging wheels, and including storage means such as a hopper for containing a supply of fusees, transport means for selecting an individual fusee from the supply and moving it into igniting relationship with an igniter, and subsequently dropping the ignited fusee on the roadway. The cart may be easily pushed by the user, such as a peace officer, and is small enough to be conveniently stored in the trunk of the automobile used by the peace officer. In the preferred form of the invention hereinafter illustrated and described in detail, the storage hopper and a telescoping handle for pushing the cart are formed into a unitary structure, which is readily assembled with and disassembled from the cart proper. Means are provided in accordance with the invention for disabling the transport, igniting and dispensing function during rearward movement of the cart, as when the peace officer tows it, rather than pushes it, back to the starting point, such as the accident scene itself.

Accordingly, it is the principal object of the invention to provide a novel igniting dispenser for fusees. Other and additional objects and purposes are to provide, in such a dispenser, storage means for fusees such as a hopper, and transport means associated with the hopper for selecting a single fusee for movement into igniting and dispensing functions; to provide, in such a dispenser, an easily assembled and disassembled relationship between the basic cart structure of the dispenser and the superstructure, including a hopper and propelling handle; to provide, in such a dispenser, an electrically heated igniter surface with which the igniter end of a fusee is forced into moving contact for ignition; to provide such a dispenser whose moving parts are actuated in timed relationship with its rolling movement along the ground, as pushed by the user; to provide in such a dispenser disabling means for insuring that, when the dispenser is being towed backwardly, no fusee is removed from the storage hopper; and for other and additional objects and purposes as will become clear from a reading of the following description of a preferred embodiment of the invention, taken in connection with the accompanying drawings.

BRIEF DESCRIPTION OF THE DRAWINGS

FIG. 1 is a side elevational view of an igniting dispenser in accordance with the present invention;

FIG. 2 is a rear elevational view of the dispenser;

FIG. 3 is a sectional view on an enlarged scale taken on the plane III—III of FIG. 2, showing a fusee just received from the hopper in the recesses of the transport disks, and, in dotted outline, an ignited fusee falling from the dispenser toward the ground;

FIG. 4 is a sectional view taken on arrows IV—IV of FIG. 3;

FIGS. 5 and 6 are fragmentary views, taken at successive moments during a cycle of operation, as seen on arrows V—V and arrows VI—VI respectively of FIG. 7;

FIG. 7 is a sectional view taken on the arrows VII—VII of FIG. 6, showing in solid lines a fusee in the position of FIG. 5, and in dotted outline the same fusee in the later position of FIG. 6;

FIG. 8 is a fragmentary view taken on the arrows VIII—VIII of FIG. 4, showing one form of the disabling means in position during rearward movement of the present dispenser; and FIG. 9 is a fragmentary view taken on arrows IX—IX of FIG. 4, showing an illustrative form of overrunning clutch for disabling the dispensing function during rearward cart movement.

DETAILED DESCRIPTION OF PREFERRED EMBODIMENT

Referring now in detail to the drawings, and first to FIGS. 1 and 2 thereof, the illustrative embodiment of the present invention includes, in its lower portion, a cart frame indicated generally at 10, here shown in the shape of a hollow rectangular structure having left and right sidewalls indicated generally at 12 and 14 respectively, and front and rear walls indicated generally at 16 and 18 respectively. Frame 10 is desirably made of lightweight rigid material such as aluminum, and is carried by a pair of wheels 20 adapted to roll on the ground 22 during operation, as will be later understood. The wheels are fixed to an axle 24 which is journaled in the sidewalls 12, 14 of frame 10. As best seen in FIG. 4, the left end of axle 24 projects outwardly of the sidewall 14, and has mounted thereon a pinion 25 in mesh with a spur gear indicated generally at 26, for purposes which will be later understood. When the present device is not in active use, it is supported by the wheels 20 and by the rear edge of frame 10, and the rear portions of sidewalls 12 and 14 may be inclined as at 27, in order to provide a more secure supporting contact with the ground.

Extending upwardly and rearwardly from frame 10 is an assembly indicated generally at 30 and including handle means indicated generally at 32, desirably of the telescoping type, and a storage means indicated generally at 34, here taking the form of an inclined supply chute or hopper for containing a quanitity of horizontally disposed fusees to be cyclically ignited and dispensed in accordance with the invention. Thus the handle means 32 may include a lower tubular female portion 35 adapted to slidingly receive an upwardly extensible handle rod 36, terminating upwardly in a horizontally disposed handle 37. Means may be provided for locking the handle rod 36 in its upper or operational position, such means here taking the form of a pin indicated generally at 38 having a shank 39 received in registering openings formed in tubular member 35 and rod 36, when the rod is in its uppermost position.

The chute or hopper 34 includes a flat rear wall indicated generally at 40, which may be fixed to the tubular portion 35 of the handle means by welds or the like 41, to form an integral structure. Hopper 34 also includes sidewalls 42, 43, projecting forwardly from rear wall 40 and preferably formed integrally therewith, the sidewalls terminating in inwardly turned front walls 44, 45, which are spaced far enough forwardly from rear wall 40 to accommodate the diameter of at least one fusee and, in the present illustrative embodiment of the invention and preferably, two fusees in stacked side by side relation.

Demountable support means are provided for carrying the hopper and handle assembly 30 on the frame 10. In the present illustrative embodiment of the invention, as best seen in FIG. 1, the rear wall 40 of the hopper 34 is provided at its lower end with a preferably integrally formed rearwardly extending portion 47 and a downwardly extending tab 48, terminating downwardly in a tongue 49, which is downwardly slidably received in a pocket formed between the rear wall 18 of frame 10 and the flat inner web portion 50 of a bracket indicated generally at 51 mounted upon rear wall 18. By this construction the entire hopper and handle assembly 30 may be disengaged from frame 10 by upward movement of the assembly 30, and may be easily reengaged with the frame 10 by sliding tongue 49 downwardly in the pocket just identified, formed by the web portion 50 of bracket 51.

Hopper 34 is open at both its upper and lower ends, and its lower end, indicated generally at 52, constitutes the supply point or station for receiving an individual fusee during operation of the present invention. More specifically, means are provided immediately below the supply station 52 for receiving an individual fusee from the hopper 34, and for transporting the individual fusee to an igniting zone and ultimately to a dispensing station where the ignited fusee is dropped downwardly onto the ground.

More specifically, and with principal reference to FIGS. 3 and 4, the transport means just mentioned consist of a pair of laterally spaced disks indicated generally at 56 and 58, fixedly mounted on a shaft indicated generally at 59 which is journaled in sidewalls 12, 14 of frame 10. As best seen in FIG. 4, shaft 59 includes an extension 60 projecting leftwardly as seen in that figure, on which spur gear 26 previously mentioned is mounted. Thus rotation of wheels 20 as the present device is propelled along the ground leftwardly as seen in FIG. 1, is translated into clockwise rotation of disks 56, 58 on shaft 59, as indicated by the enlarged arcuate arrows in FIG. 3.

Each of the disks 56, 58 is provided with a peripheral recess 61 and 62 respectively, and the disks are so mounted on shaft 59 that the recesses 61, 62 are in alignment. As will be seen in FIGS. 1 and 3, each of the recesses includes a semicircular inner portion or bottom, and generally parallel sidewalls extending outwardly to the periphery of the respective disk. The recesses are so sized as to receive only one of the fusees to be dispensed in accordance with the present invention.

In the operation of the dispenser in accordance with the present invention, a supply of fusees is first prepared by removing the protective cap on the igniter end, and discarding that cap. The fusees are then loaded into the hopper 34 in horizontal stacked relation, with their bared igniter ends all lying in a common vertical plane, the igniter ends pointed leftwardly as viewed in FIG. 2 of the drawings. A supply of fusees so disposed is indicated at 64 in FIG. 3. In the functioning of the present dispenser, the transport means consisting of the spaced parallel disks 56, 58, rotate clockwise as seen in FIGS. 3, 5 and 6. As the aligned recesses 61, 62 of the disks pass beneath the front row of the stacked fusees, the lowermost fusee in that row, indicated generally at 65 in FIG. 3, and having an igniter cap 72 at one end, will fall into the recesses 61, 62. Continued clockwise rotation of the disks, caused by continued forward propulsion of the entire device by the user, moves the fusee 65 from its position seen in FIG. 3 to, successively, its positions seen in FIGS. 5 and 6. Means are provided in accordance with the invention for retaining the fusee within the slots during that movement of the transport disks, and such means are here exemplarily shown as including a pair of laterally spaced vanes 66 and 68, each in substantial alignment with one of the disks 56, 58, and mounted upon rear wall 18 of frame 10 by suitable fastening means 70. The vanes project forwardly from that rear wall, and terminate in concave arcuate front edges, the front edge 67 of vane 66 being seen in FIGS. 3, 5 and 6. The front edges are substantially concentric with the peripheries of the transport disks 56, 58, and are slightly spaced radially outwardly therefrom.

Igniter means are provided in accordance with the present invention for heating and thereby igniting the igniter cap 72 of an individual fusee as it is moved from the supply station seen in FIG. 3 through the igniter station seen in FIG. 5 and to the dispensing station seen in FIG. 6. In the present illustrative form of the invention, the igniter means, as best seen in FIGS. 4 and 7, includes a generally L-shaped body indicated generally at 75 including a base portion 76 and a downwardly extending leg portion 77. The lower leg portion has mounted on its inner face a heating unit 78 which may consist, for example, of an extended coil of electric wire, and an inner contact plate 79, having a smooth inner surface 80. The igniter body 75 is pivotally mounted on sidewall 12 of frame 10, as by a pivot pin 81 extending between and carried by a pair of spaced support brackets 82 and 83. Means are provided for resiliently biasing the igniter body 75 inwardly toward frame 10, such means being here shown as a tension spring 85 serving to urge the igniter body 75 from its extended position seen in FIG. 7 to its retracted position seen in FIG. 4. As best seen in FIG. 6, the lower leg portion 77 of igniter body 75 extends arcuately through a substantial arc between divergent edges 86 and 87, and the heating element 78 and the inner plate 79 are also arcuately shaped. Electrical power for heating the heater element 78 in the igniter means may be provided from a battery indicated generally at 90 (see FIG. 3) through wires fragmentarily shown at 91, 92 to terminals 93 and 94. Flow of electrical power from battery 90 to the heater element 78 is under the control of a switch 95, and the major portions of the electric wires leading power to the heater unit 78 are omitted for reasons of clarity.

Means are provided in accordance with the invention for axially moving the selected fusee carried in the disk recesses 61, 62, so that its igniter cap 72 is brought into contact with the heated surface 80 of plate 79, in order to ignite the igniter cap. In the present form of the invention, such means for moving the fusee include a cam indicated generally at 100, and best shown in FIGS. 4 and 7. Cam 100 is mounted on sidewall 14 of frame 10, is generally arcuate in shape, and presents an inclined ramp face 102 inwardly of the frame. The opposite sidewall 12 has formed therein an arcuate slot indicated generally at 104 in substantial alignment with the arcuate ramp 100 on wall 14 and, as best seen in FIG. 6, arcuate slot 104 terminates at its lower end in a downwardly directed discharge throat indicated generally at 106 and defined laterally by edges 107 and 108 which are spaced apart by a distance somewhat greater than the diameter of a fusee 65, to permit the ignited end portion of a fusee, after ignition, to move downwardly through the throat. The forwardly directed edge 108 of the throat 106 is in lateral alignment with the forwardly directed edges 110 and 112 of vanes 66 and 68 respectively.

After a desired number of ignited fusees have been dispensed in the above manner, while the user pushes the device along the ground, the user will usually return to the starting point, which may be the scene of the accident being protected. In order to so return without dispensing additional flares, means are provided in the present invention for disabling the dispensing function during rearward rolling movement of the device. Thus the user can tow the device behind him in returning to the starting point, rather than pushing it before him, as is the case during dispensing. In the present illustrative embodiment of the invention, such disabling means include the provision of a pair of pivotally mounted dogs on the transport disks 56 and 58, the dogs being indicated generally at 120 and 122 respectively. As best appears in FIG. 3, dog 120 is pivotally mounted on a short rod 123 fixed to disk 56 and projecting outwardly from the face of the disk. Dog 120 includes a convex edge 124 having a radius of curvature substantially equal to that of the disk. The opposite edge 125 of the dog may be of any desired shape, so long as it does not project outwardly of the periphery of the disk, and side 125 may be provided at its outer end with a notched recess 126. In its normal or inoperative position seen in FIG. 3, the distal portion of dog 120 is supported by abutting contact against stop pin 127, which is fixed to the disk 56 and projects outwardly from the face thereof. With reference to FIG. 8, dog 120 is shown in its operative position for disabling the transport function of the disk, by bridging the peripheral recess 61 formed in the disk. In this position the distal end of dog 120 is supported by abutting engagement between a second stop pin 128 and the recessed notch 126 of the dog. The pivot rod 123 and the stop pin 128 are so positioned that the convex edge 124 of dog 120 is aligned with, and immediately adjacent to, the outer periphery of disk 56, thereby preventing the entrance of a fusee into the recess 61. The other dog 122, mounted on transport disk 58, is symmetrically identical to dog 120.

Dogs 120 and 122 are caused to assume either their inoperative position as illustrated in FIG. 3, or their operative position seen in FIG. 8 under the influence of gravity, depending upon the direction of rotation of the transport disks. Thus, in FIG. 3, the disk 56 there shown is assumed to rotate clockwise as the dispenser is pushed forwardly during the actual igniting and dispensing function, and under those conditions dog 120 will, after commencing upward movement from its nadir, rotate through a portion of a circle about the axis of rod 123 until the convex side 120 rests upon stop pin 127. Disk recess 61 is thus open, available to receive a fusee. On the other hand, when the transport disks rotate counter-clockwise, as when the dispenser is being towed rather than pushed, the dogs, after leaving their nadirs and commencing upward movement, will eventually assume the position illustrated in FIG. 8, thus blocking the entrance of a fusee into the disk recess.

Alternatively, or in addition, the disabling means may take the form of an overrunning clutch in the power train between the wheels and the transport disks. An illustrative form of such an overrunning clutch is shown in FIG 9, and includes a ratchet gear indicated generally at 140 mounted on shaft extension 60, and a pair of pawls 142, 144, pivotally mounted on pins 143, 145 carried by spur gear 26. Other forms of overrunning clutches, such as the type employing balls or rollers which are releasably wedgable in cages or runways, are of course within the contemplation of the invention.

Variations and modifications from the illustrative form of the invention hereinabove described and illustrated are intended to be embraced within the scope of the appended claims.

I claim:

1. A machine for cyclically dispensing an ignited fusee at spaced intervals along the ground comprising:
    a rollable cart having at least one ground-engaging wheel;
    storage means for holding a supply of fusees, each having an igniter portion;
    igniter means for igniting said portion by contact therewith;
    transport means for receiving a single fusee from the storage means, moving it so that its igniter portion contacts the igniter means, and then dispensing the ignited fusee from the machine;
    and means interengaging the transport means with the wheel whereby an ignited fusee is dispensed in timed relation with rotation of the wheel in a forward direction.

2. The invention as defined in claim 1 wherein the storage means comprise a hopper extending upwardly from and supported by the cart.

3. The invention as defined in claim 2 including an upwardly extending handle fixed to the hopper to form a unitary structure.

4. The invention as defined in claim 3 including means for rapidly assembling the unitary structure to the cart, comprising means carried by the cart for forming a substantially vertically extending pocket, and a tongue carried by the unitary structure adapted to be received downwardly in the pocket.

5. The invention as defined in claim 3 wherein said handle includes a lower tubular portion fixed to the hopper, and an upper rod portion slidably received in the tubular portion, and including means for selectively locking the rod in its uppermost position relative to the tubular portion.

6. The invention as defined in claim 2 in which the fusees constituting said supply each consist of an elongated cylindrical body, and the fusees are stored in the hopper in horizontal, side-by-side relation.

7. The invention as defined in claim 6 wherein the igniter portion of each fusee constitues an igniter cap at one end of the fusee, and the fusees are stored in the hopper with their igniter caps lying in a vertical plane.

8. The invention as defined in claim 2 wherein said transport means includes a pair of transport members spaced laterally of the cart, each element including a fusee-receiving recess, the recesses being laterally aligned.

9. The invention as defined in claim 8 wherein said transport elements comprise a pair of transport disks, and the recesses are formed in the peripheries of the disks.

10. The invention as defined in claim 9 wherein said transport disks are fixedly mounted on a common shaft, and said interengaging means include means for rotating the shaft in timed relation with rotation of the wheel.

11. The invention as defined in claim 1 including disabling means for preventing the transport means from receiving a fusee from the storage means when wheel rotation is rearward.

12. The invention as defined in claim 11 wherein the interengaging means includes a power train, and the disabling means comprises an overrunning clutch in the power train.

13. The invention as defined in claim 11 wherein said transport means includes a pair of transport disks fixedly mounted in laterally spaced relation on a transverse shaft carried by the cart, each disk provided with a peripheral recess, the recesses being laterally aligned, and the disabling means comprising elements blocking fusee entrance into said recesses when said shaft and disks rotate in a direction corresponding to rearward direction of said wheel rotation.

* * * * *